United States Patent [19]

Shimizu et al.

[11] Patent Number: 4,564,652

[45] Date of Patent: Jan. 14, 1986

[54] PROCESS FOR PREPARING AQUEOUS DISPERSION OF POLYTETRAFLUOROETHYLENE

[75] Inventors: Tetsuo Shimizu; Masafumi Akamatsu, both of Osaka, Japan

[73] Assignee: Daikin Industries, Ltd., Osaka, Japan

[21] Appl. No.: 649,707

[22] Filed: Sep. 12, 1984

[30] Foreign Application Priority Data

Sep. 12, 1983 [JP] Japan .................................. 58-168670

[51] Int. Cl.$^4$ ............................................. C08L 27/12
[52] U.S. Cl. ..................................................... 524/805
[58] Field of Search ....................... 524/805, 773, 758

[56] References Cited

U.S. PATENT DOCUMENTS

| | | | |
|---|---|---|---|
| 3,009,892 | 11/1961 | Duddington et al. | 524/805 |
| 3,391,099 | 7/1968 | Punderson | 524/805 |
| 4,038,231 | 7/1977 | Downer et al. | 524/805 |
| 4,186,121 | 1/1980 | Gangal | 526/206 |
| 4,342,675 | 8/1982 | Gangal | 526/81 |

FOREIGN PATENT DOCUMENTS

| | | | |
|---|---|---|---|
| 0043499 | 1/1982 | European Pat. Off. | 524/805 |
| 1071992 | 7/1967 | United Kingdom . | |

*Primary Examiner*—Joseph L. Schofer
*Assistant Examiner*—N. Sarofim
*Attorney, Agent, or Firm*—Birch, Stewart, Kolasch & Birch

[57] ABSTRACT

An aqueous PTFE dispersion containing colloidal PTFE particles having a comparatively large average particle size is prepared by polymerizing TFE in an aqueous medium at a temperature of from 10° to 100° C. in the presence of a fluorine-containing dispersant and a water soluble polymerization initiator, in which, after the initiation of the polymerization and before consumption of 30% of TFE to be polymerized, TFE is polymerized at a pressure not higher than 4 Kg/cm$^2$ for a period in which at least 1 g of TFE per liter of the aqueous medium is consumed, and then the rest of TFE is polymerized at a pressure of from 6 to 30 Kg/cm$^2$, which dispersion does not contain any metal ion that reduces interfacial potential of the colloidal particle.

7 Claims, 3 Drawing Figures

PROCESS FOR PREPARING AQUEOUS DISPERSION OF POLYTETRAFLUOROETHYLENE

FIELD OF THE INVENTION

The present invention relates to a process for preparing an aqueous dispersion of polytetrafluoroethylene (hereinafter referred to as "PTFE"). More particularly, it relates to a process for preparing an aqueous PTFE dispersion containing colloidal PTFE particles having a comparatively large average particle size.

BACKGROUND OF THE INVENTION

PTFE fine powder prepared by coagulating and drying an aqueous PTFE dispersion is used as a coating for wire and cable, a tube having a small or large diameter, sealing tape, etc. In such applications of PTFE fine powder, the relationship between the characteristics of PTFE fine powder and its processability has been extensively studied and it has been found, for example, that PTFE fine powder having a larger average particle size is paste extruded at a lower extrusion pressure.

Various processes for preparing an aqueous PTFE dispersion comprising colloidal PTFE particles having a comparatively large average particle size have been developed and described, for example, in Japanese Patent Publication Nos. 16154/1968, 39829/1970 and 14466/1971.

The process described in Japanese Patent Publication No. 16154/1968 is characterized in that, in polymerization of tetrafluoroethylene (hereinafter referred to as "TFE") in an aqueous medium, $1 \times 10^{-5}$ to $1 \times 10^{-4}$ mol/l of a water soluble compound selected from the group consisting of water soluble compounds of zinc, aluminum and alkaline earth metals which afford cations when dissolved in the aqueous medium is added to the aqueous medium. Thereby, the average particle size of the PTFE particle is controlled. The metal ion to be added in this process, however, finally constitutes a contaminant in the polymerization system and reduces interfacial potential of the colloidal particle resulting in deterioration of stability of the system.

The processes described in Japanese Patent Publication Nos. 39829/1970 and 14466/1971 are characterized in that the average particle size of PTFE is controlled by the addition of a specific dispersant (i.e. a surfactant) at a specific time in the course of the polymerization. Although mono-dispersed collidal PTFE particles having a large average particle size are prepared by these processes, it is not convenient to add an aqueous concentrate of the dispersant in the course of the polymerization.

SUMMARY OF THE INVENTION

As a result of extensive study to overcome the drawbacks of the conventional processes and to provide a convenient process for preparing PTFE particles having a comparatively large average particle size, it has now been found that when initial polymerization pressure is made lower for a specific period of time than the polymerization pressure during the rest of polymerization period, colloidal PTFE particles having a comparatively large average particle size are prepared.

Accordingly, the present invention provides a process for preparing an aqueous PTFE dispersion containing colloidal PTFE particles having a comparatively large average particle size, comprising polymerizing TFE in an aqueous medium at a temperature of from 10° to 100° C. in the presence of a fluorine-containing dispersant and a water soluble polymerization initiator, in which, after the initiation of the polymerization and before consumption of 30% of TFE to be polymerized, TFE is polymerized at a pressure of not higher than 4 Kg/cm² for a period in which at least 1 g of TFE per liter of the aqueous medium is consumed, and then the rest of TFE is polymerized at a pressure of from 6 to 30 Kg/cm².

DETAILED DESCRIPTION OF THE INVENTION

Figure 1:
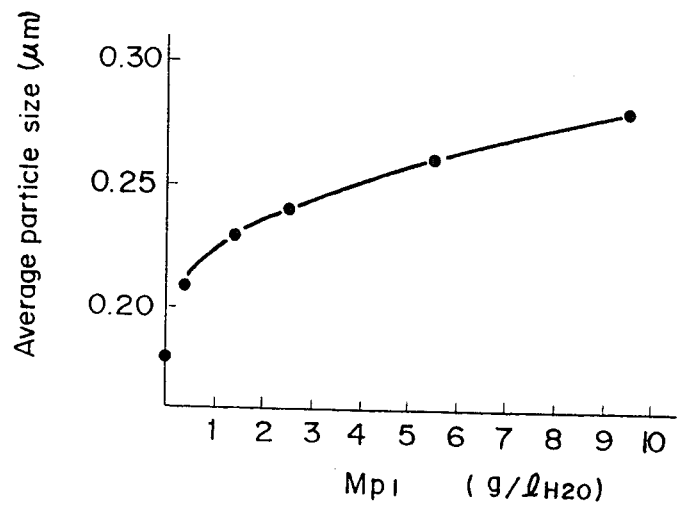
FIGS. 1, 2 and 3 show the relationships between $MP_1$ and the average particle size, between $P_1$ and the average particle size, and between the average particle size and the extrusion pressure respectively.

Specific examples of the fluorine-containing dispersant used in the process of the invention are a compound of the formula:

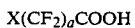
$$X(CF_2)_a COOH$$

wherein X is hydrogen, fluorine or chlorine and a is an integer of 6 to 12, a compound of the formula:

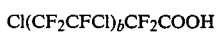
$$Cl(CF_2CFCl)_b CF_2 COOH$$

wherein b is an integer of 2 to 6 and a compound of the formula:

$$F(CF_2)_c O[CF(Y)CF_2O]_d CF(Y)COOH$$

wherein Y is fluorine or lower perfluoroalkyl, c is an integer of 1 to 5 and d is an integer of 0 to 10, and salts of these compounds, for example, with ammonium, sodium and potassium. Usually, the amount of the dispersant to be added to the aqueous medium is from 0.01 to 0.5% by weight.

Specific examples of the water soluble polymerization initiator are water soluble persulfates (eg. ammonium persulfate and potassium persulfate), water soluble aliphatic dibasic carboxylic acid peroxides (eg. disuccinic acid peroxide and diglutaric acid peroxide) and a mixture thereof. Usually, the amount of the initiator to be used is, in case of ammonium persulfate, from 0.0001 to 0.2% by weight, preferably from 0.001 to 0.1% by weight based on the weight of the aqueous medium and, in case of disuccinic acid peroxide, from 0.005 to 0.5% by weight, preferably from 0.01 to 0.2% by weight based on the weight of the aqueous medium. When the polymerization is carried out at a low temperature, a redox type initiating system comprising the above peroxide and a reducing agent (eg. alkalimetal disulfite and bisulfite) may be used.

To the polymerization system, a dispersion stabilizer may be added and its specific examples are hydrocarbons having at least 12 carbon atoms which are liquid under the polymerization conditions (eg. paraffins, mineral oils, etc.).

Further, as a modifier of PTFE, at least one monomer copolymerizable with TFE may be present in the polymerization system in such an amount that 0.001 to 2% by weight, preferably from 0.002 to 0.5% by weight of the modifier is copolymerized. Specific examples of the modifier are compounds of the formulas:

$$X(CF_2)_nCF=CF_2 \quad X(CF_2)_{n+1}OCF=CF_2 \text{ and}$$

$$C_3F_7O(\underset{\underset{CF_3}{|}}{C}FCF_2O)_mCF=CF_2$$

wherein X is the same as defined above, n is an integer of 0 to 7 and m is 1 or 2.

Generally, in the conventional processes in which the polymerization is carried out at a pressure of from 6 to 30 Kg/cm² over the whole polymerization period, copolymerization of the modifier with TFE affords colloidal PTFE particles having a smaller average particle size. On the contrary, by the process of the invention, colloidal PTFE particles having a comparatively large average particle size are produced even when the modifier is copolymerized. The addition mode of the modifiers is not critical. Preferably, in the low pressure polymerization period, the modifier is also used in a reduced amount corresponding to the TFE partial pressure.

These modifier are conventionally used ones to modify PTFE and easily available.

The polymerization temperature is usually from 10° to 100° C., preferably from 20° to 90° C.

Control of the polymerization pressure is one of the characteristics of the invention. In a so-called nuclei forming period, namely a period after the initiation of the polymerization and before the consumption of 30%, preferably 10% of TFE to be polymerized, the polymerization pressure is kept at a pressure of not higher than 4 Kg/cm² (herein referred to as "$P_1$"). At such low polymerization pressure, the polymerization is carried out for a period in which at least 1 g, preferably at least 2 g of TFE per liter of the aqueous medium is consumed. The longer this period, the more satisfactorily the object of the invention achieved. However, if the low pressure period is too long, too large PTFE particles are formed and the polymerization system is rendered to be unstable. When $P_1$ is slightly higher, the low pressure period is prolonged to some extent. Otherwise, sufficiently large PTFE particles are not produced. However, too low $P_1$ makes the polymerization time too long, which deteriorates the producibility. The preferred $P_1$ is a sum of the TFE partial pressure of 0.2 to 2 Kg/cm² and water-vapor pressure at a polymerization temperature. If $P_1$ is higher than 4 Kg/cm², the object of the invention is not achieved.

Figure 2:
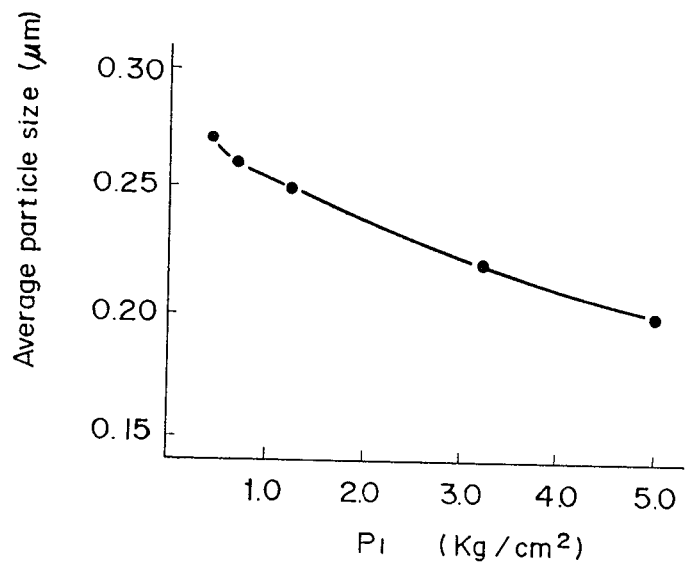

Influences of the consumed amount of TFE in the low pressure period (herein referred to as "$MP_1$") and of $P_1$ on the particle size of PTFE (not including the modifier) are shown in FIGS. 1 and 2. The data is obtained in the below described Examples.

After the low pressure polymerization period, the polymerization pressure is raised to a pressure of from 6 to 30 Kg/cm² (hereinafter referred to as "$P_2$") and the polymerization is continued to obtain the colloidal PTFE particle of the invention. During raising the polymerization pressure from $P_1$ to $P_2$, the polymerization proceeds, but the present invention does not restrict the raising rate of the polymerization pressure. Usually, concentration of the thus prepared aqueous PTFE dispersion is from 20 to 40% by weight.

From the aqueous PTFE dispersion of the invention, the PTFE fine powder is obtained by a per se conventional method, for example, by coagulation, co-coagulation, etc. The aqueous PTFE dispersion of the invention may be used as a coating material. In this case, the dispersion may be used as such or together with an adhesive assistant, or the aqueous dispersion may be converted to organosol. With the dispersion of the invention, critical thickness for cracking, namely the maximum thickness of a coating with which the dispersion is coated at a time without cracking is improved.

Since the aqueous PTFE dispersion obtained by the process of the invention does not contain any metal ion that is inevitably contained in the dispersion of Japanese Patent Publication No. 16154/1968, the interfacial potential of the colloidal particle is not reduced and the system is stable. The workability of the present process is superior to the conventional methods in which the dispersant should be added in the course of the polymerization.

PREFERRED EMBODIMENTS

The present invention will be hereinafter explained further in detail by following Examples.

In Examples, the average particle sizes (1) and (2) of the colloidal PTFE particles and the paste extrusion pressure are measured as follows:

Average particle size (1)

With a light transmission type centrifugal sedimentation particle size distribution analyzer (CAPA-500, manufactured by Kabushikikaisha Horiba Seisakusho), 50% diameter based on area is measured under following conditions:

| | |
|---|---|
| Viscosity of the dispersing medium: | 0.89 cp |
| Density of the medium: | 1.00 g/ml |
| Density of the dispersion: | 2.28 g/ml |
| Revolution rate: | 4,000 rpm |

Average particle size (2)

A calibration curve is first prepared from transmittance of light having a wavelength of 500 nm through a unit length of an aqueous PTFE dispersion having a solid content of about 0.22% by weight and a number average particle size calculated from an electron microphotograph. Transmittance of each sample is measured and its average particle size is determined from the calibration curve.

Paste extrusion pressure

PTFE fine powder (50 g) and an extrusion assistant (10.8 g) (Trade name "IP 1620", manufactured by Idemitsu Petrochemical Co., Ltd.) are mixed in a glass bottle and aged at 25°±2° C. for 1 hour. A cylinder (inner diameter of 25.4 mm) and an extrusion die (die angle of 30°, nozzle diameter of 2.54 mm, nozzle length of 7 mm) are filled with the mixture and load of 100 Kg is applied to a piston for 1 minute. Then, the mixture is extruded at a ram speed of 760 mm/min. to obtain a strand. The extrusion pressure is calculated by dividing the extrusion pressure in the equilibrated latter half period by the cross sectional area of the cylinder.

EXAMPLE 1

To a 1 liter glass made autoclave equipped with a paddle agitator, deionized deoxydized water (545 ml), liquid paraffin (first class grade reagent, 30 g) and ammonium perfluorooctanate (0.55 g) were charged. The interior space of the autoclave was replaced three times with nitrogen gas and two times with TFE at 70° C.

TFE was injected to pressurize to 0.65 Kg/cm$^2$ (corresponding to P$_1$) with TFE partial pressure being 0.34 Kg/cm$^2$. Thereafter, a solution of ammonium persulfate (5 mg) in water (5 ml) was added to the mixture contained in the autoclave with agitating it at 500 rpm. Polymerization very slowly proceeded. Till 5.5 g of TFE (corresponding to MP$_1$) was consumed after 4.0 hours from the addition of the initiator, the internal pressure was kept at 0.65 Kg/cm$^2$. Then, TFE was injected to pressurize to 10 Kg/cm$^2$ (corresponding to P$_2$) and the polymerization was carried out at the same pressure. When 350 g of TFE (corresponding to MP$_2$) was consumed in all, the agitator and the injection of TFE were stopped and the unreacted TFE was purged to terminate the polymerization. The polymerization time at 10 kg/cm$^2$ was 9.5 hours. The temperature was kept at 70° C. over the whole polymerization period. The thus prepared aqueous PTFE dispersion was stable and very few PTFE particle was coagulated on the blades of the agitator and the inner wall of the autoclave.

The average particle size of the colloidal PTFE particle was 0.26 micrometers. The past extrusion pressure of the PTFE fine powder obtained by coagulating, particulating and then dying at 130° C. the colloidal PTFE particle was 128 Kg/cm$^2$.

COMPARATIVE EXAMPLE 1

In the same manner as in Example 1 but maintaining the pressure at 10 Kg/cm$^2$ over the whole period, the polymerization was carried out for 6.3 hours. 350 g of TFE was consumed. The average particle size of the collidal particles was 0.18 micrometer and the paste extrusion pressure was 162 Kg/cm$^2$.

EXAMPLES 2–4

In the same manner as in Example 1 but adjusting MP$_1$ to 1.4 g (Example 2), 2.5 g (Example 3) and 9.5 g (Example 4), the polymerization was carried out. The average particle size was 0.23, 0.24 and 0.28 micrometer respectively, and the paste extrusion pressure was 143, 138 and 122 Kg/cm$^2$ respectively.

EXAMPLES 5–7

In the same manner as in Example 1 but adjusting P$_1$ to 0.45 Kg/cm$^2$ (Example 5), 1.25 Kg/cm$^2$ (Example 6) and 3.25 Kg/cm$^2$ (Example 7), the polymerization was carried out. In Example 5, the low pressure polymerization period was very long. The results are shown in Table.

COMPARATIVE EXAMPLE 2

In the same manner as in Example 1 but adjusting MP$_1$ to 0.4 g, the polymerization was carried out. The results are shown in Table.

COMPARATIVE EXAMPLE 3

In the same manner as in Example 1 but adjusting P$_1$ to 5.0 Kg/cm$^2$, the polymerization was carried out. The average particle size of the colloidal particles was 0.20 micrometer and the paste extrusion pressure was 158 Kg/cm$^2$. In comparison with Comparative Example 1, the increase of the particle size and the decrease of the extrusion pressure are small.

All the results are summarized in Table.

Figure 3:
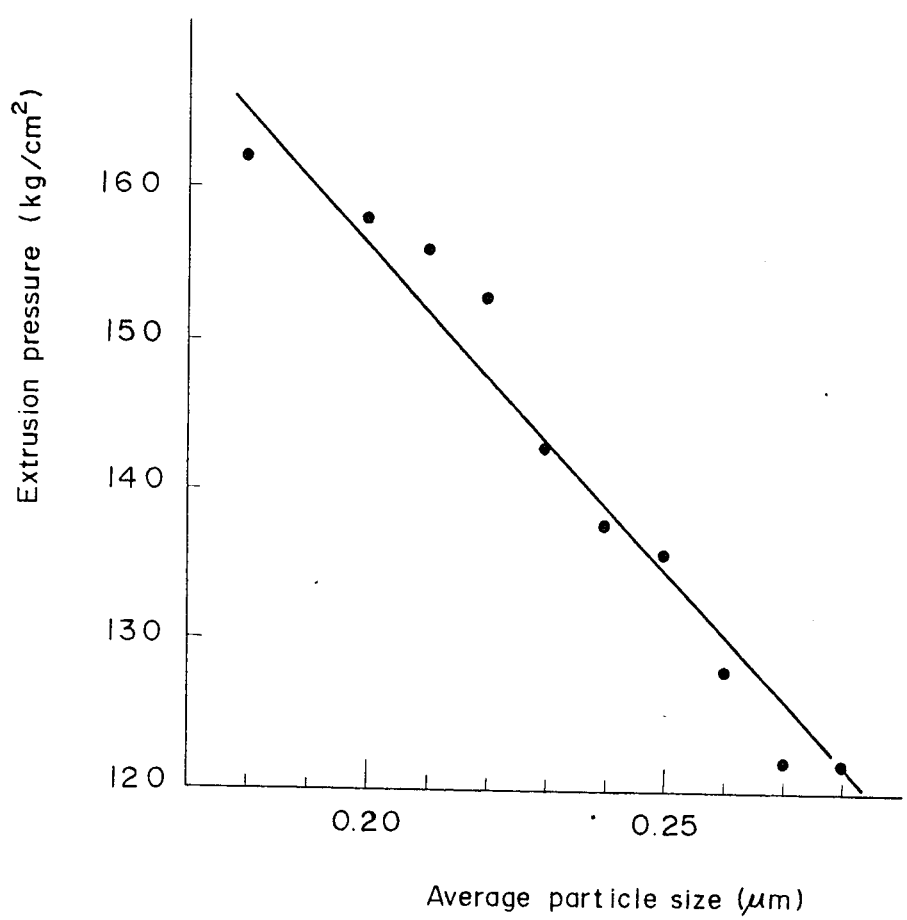

Further, the relationships between MP$_1$ and the average particle size (P$_1$=0.65 Kg/cm$^2$), between P$_1$ and the average particle size (MP$_1$=5.5 g) and between the average particle size and the extrusion pressure are shown in FIGS. 1, 2 and 3 respectively.

TABLE

| | P$_1$ (Kg/cm$^2$) | MP$_1$ (g/l water) | Low pressure period (hrs) | P$_2$ (Kg/cm$^2$) | MP$_2$ (g/l water) | High pressure period (hrs) | Average particle size (micrometer) | Extrusion pressure (Kg/cm$^2$) |
|---|---|---|---|---|---|---|---|---|
| Ex. 1 | 0.65 | 5.5 | 4.0 | 10 | 350 | 9.5 | 0.26 | 128 |
| Ex. 2 | 0.65 | 1.4 | 1.5 | 10 | 345 | 8.3 | 0.23 | 143 |
| Ex. 3 | 0.65 | 2.5 | 2.5 | 10 | 355 | 10.4 | 0.24 | 138 |
| Ex. 4 | 0.65 | 9.5 | 6.5 | 10 | 346 | 13.0 | 0.28 | 122 |
| Ex. 5 | 0.45 | 5.5 | 10.0 | 10 | 345 | 16.0 | 0.27 | 122 |
| Ex. 6 | 1.25 | 5.5 | 1.7 | 10 | 350 | 8.5 | 0.25 | 136 |
| Ex. 7 | 3.25 | 5.5 | 0.6 | 10 | 352 | 6.2 | 0.22 | 153 |
| Comp. Ex. 1 | — | — | — | 10 | 350 | 6.3 | 0.18 | 162 |
| Comp. Ex. 2 | 0.65 | 0.4 | 0.8 | 10 | 348 | 7.5 | 0.21 | 156 |
| Comp. Ex. 3 | 5 | 5.5 | 0.3 | 10 | 352 | 6.0 | 0.20 | 158 |

EXAMPLE 8

To a 1 liter glass made autoclave equipped with a paddle agitator, deionized deoxydized water (545 ml), liquid paraffin (30 g) and ammonium perfluorooctanate (0.55 g) were charged. The interior space of the autoclave was replaced three times with nitrogen gas and two times with TFE at 70° C. Perfluoro(n-propyl vinyl ether) [n-C$_3$F$_7$OCF=CF$_2$ (hereinafter referred to as "PPVE") 0.5 g, purity 98%] was added. Then, TFE was injected to pressurize to 5 Kg/cm$^2$. Thereafter, a solution of ammonium persulfate (15 mg) in water (5 ml) was added to the mixture contained in the autoclave with agitating it at 500 rpm. As the polymerization proceeded, the pressure was gradually dropped to 3.5 Kg/cm$^2$ (corresponding to P$_1$) after 35 minutes, during which about 7 g of TFE was consumed. The same pressure was kept till 9.5 g of TFE (corresponding to MP$_1$) was consumed after about 30 minutes after 1 hour from the initiation of the polymerization. Then, TFE was injected to pressurize to 10 Kg/cm$^2$ (corresponding to P$_2$) and the same pressure was kept by injecting TFE. When 350 g of TFE (corresponding to MP$_2$) was consumed in all, the agitator and the injection of TFE were stopped and the unreacted TFE was purged to terminate the polymerization. Total polymerization time was 8.5 hours. The temperature was kept at 70° C. over the whole polymerization period.

The average particle size of the colloidal PTFE particles was 0.17 micrometers. The content of the comonomer (modifier) in PTFE was found to be 0.085% by weight according to the infrared spectroscopic analysis described in Japanese Patent Publication No. 38159/1975 and U.S. Pat. No. 3,819,594).

EXAMPLE 9

To a 1 liter glass made autoclave equipped with a paddle agitator, deionized deoxydized water (545 ml), liquid paraffin (30 g) and ammonium perfluorooctanate (0.55 g) were charged. The interior space of the autoclave was replaced three times with nitrogen gas and two times with TFE at 70° C., and PPVE (0.1 g) was added. Then, TFE was injected to pressurize to 2 Kg/cm$^2$. Thereafter, a solution of ammonium persulfate (15 mg) in water (5 ml) was added to the mixture contained in the autoclave with agitating it at 500 rpm. By injecting TFE for about 50 minutes, the internal pressure was kept at 2.0 to 1.5 Kg/cm$^2$, during which 8.0 g of TFE was consumed. Then, PPVE (0.4 g) was added and TFE was injected to pressurize to 10 Kg/cm$^2$ (corresponding to P$_2$) and the same pressure was kept by injecting TFE for 8.3 hours. When 350 g of TFE (corresponding to MP$_2$) was consumed in all, the agitator and the injection of TFE were stopped and the unreacted TFE was purged to terminate the polymerization. The temperature was kept at 70° C. over the whole polymerization period.

The average particle size of the colloidal PTFE particles was 0.19 micrometers. The content of the comonomer in PTFE was 0.082% by weight.

COMPARATIVE EXAMPLE 4

In the same manner as in Example 8 but maintaining the pressure at 10 Kg/cm$^2$ over the whole polymerization period, the polymerization was carried out for 7.2 hours. 350 g of TFE was consumed. The average particle size of the collidal particles was 0.12 micrometer and the comonomer content was 0.090% by weight.

EXAMPLE 10

To a 6 liter glass made autoclave equipped with a paddle agitator, deionized deoxydized water (2,990 ml), solid paraffin having a melting point of 56° C. (100 g) and ammonium perfluorooctanate (3.0 g) were charged. The interior space of the autoclave was replaced three times with nitrogen gas and two times with TFE at 70° C. PPVE (0.2 g) was added. Then, TFE was injected to pressurize to 2 Kg/cm$^2$. Thereafter, a solution of ammonium persulfate (30 mg) in water (10 ml) was added to the mixture contained in the autoclave with agitating it at 500 rpm. By injecting TFE for about 40 minutes, the internal pressure was kept at 2.0 to 1.5 Kg/cm$^2$, during which about 20 g of TFE was consumed. Then, PPVE (0.7 g) was added and TFE was injected to pressurize to 10 Kg/cm$^2$ (corresponding to P$_2$) and the same pressure was kept by injecting TFE in the rest of polymerization period. After pressurizing to 10 Kg/cm$^2$, each 0.7 g of PPVE was added six times every consumption of 200 g of TFE. When 1,350 g of TFE (corresponding to MP$_2$) was consumed in all, the agitator and the injection of TFE were stopped and the unreacted TFE was purged to terminate the polymerization. The temperature was kept at 70°±1° C. over the whole polymerization period. The polymerization time at 10 Kg/cm$^2$ was 9.8 hours.

The average particle size of the colloidal PTFE particles was 0.19 micrometers. The content of the comonomer in PTFE was 0.18% by weight.

In the above Examples, the average particle sizes were Particle sizes (1). Particle size (2) was larger than Particle size (1) by about 0.05 micrometer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polymerization process for preparing an aqueous PTFE dispersion containing colloidal PTFE particles having a comparatively large average particle size, comprising polymerizing TFE in an aqueous medium at a temperature of from 10° to 100° C. in the presence of a fluorine-containing dispersant and a water soluble polymerization initiator, in which, during a first phase of said polymerization process including a period just after the initiation of the polymerization and before consumption of 30% of said TFE to be polymerized, said polymerization process is regulated at a pressure not higher than 4 Kg/cm2, during which period at least 1 g of TFE per liter of said aqueous medium is consumed, and during a second phase of said polymerization process including a period wherein the remainder of said TFE is polymerized, said polymerization process is regulated at a pressure of from 6 to 30 Kg/cm$^2$.

2. A process according to claim 1, wherein at least one modifier copolymerizable with said tetrafluoroethylene selected from the group consisting of compounds of the formulas:

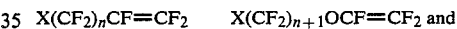

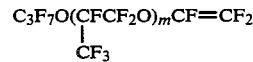

wherein X is hydrogen, fluorine or chlorine, n is an integer of 0 to 7 and m is 1 or 2 is present in said polymerization aqueous medium.

3. A process according to claim 1, wherein the period of said first phase of said polymerization process includes just after the initiation of said polymerization and before consumption of 10% of said tetrafluoroethylene to be polymerized, and partial pressure of tetrafluoroethylene during this period is from 0.2 to 2 Kg/cm$^2$.

4. A process according to claim 1, wherein said fluorine-containing dispersant is one selected from the group consisting of a compound of the formula:

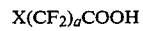

wherein X is hydrogen, fluorine or chlorine, and a is an integer of 6 to 12, a compound of the formula:

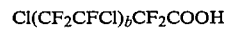

wherein b is an integer of 2 to 6 and a compound of the formula:

wherein Y is fluorine or lower perfluoroalkyl, c is an integer of 1 to 5 and d is an integer of 0 to 10, and salts of these compounds with ammonium, sodium and potassium.

5. A process according to claim 1, wherein said polymerization initiator is one selected from the group consisting of water soluble persulfates, water soluble aliphatic dibasic acid peroxides and a mixture thereof.

6. A process according to claim 5, wherein said polymerization initiator is ammonium persulfate.

7. A process according to claim 1, wherein said polymerization aqueous medium comprises at least one dispersion stabilizer selected from the group consisting of hydrocarbons having at least 12 carbon atoms which are liquid under the polymerization conditions.

* * * * *